Aug. 10, 1937.  A. L. EMENS  2,089,884
ELECTRIC METER
Filed June 2, 1936

Inventor:
Albert L. Emens,
By Louis Robertson atty.

Patented Aug. 10, 1937

2,089,884

UNITED STATES PATENT OFFICE 2,089,884

ELECTRIC METER

Albert L. Emens, La Fayette, Ind., assignor to Duncan Electric Manufacturing Company, La Fayette, Ill., a corporation of Illinois Application June 2, 1936, Serial No. 83,016

7 Claims. (Cl. 171—34)

This invention relates to electric meters, and more specifically to devices for facilitating the sealing of watthour meter covers against tampering.

Electricity thieves are often both ingenious and persistent in their efforts to so tamper with a meter or its connections as to be able to use more current than the meter registers. Although thieves of this type comprise only a small part of the population, yet the number of them would probably surprise anyone outside of the electric industry. Meter manufacturers have long had the practice of providing means for sealing meters closed by means of a wire, the two ends of which are sealed in a button of lead which would indicate any tampering therewith. As is well known, the loop of wire thus formed would tie together two elements, the separation of which is necessary in order to remove the cover of the meter. It has also been the practice for some time to enclose the wires from the supply lines in piping and to house the connections of these lines to the meter in a metal box, sometimes called the terminal chamber.

An object of the present invention is to provide more efficient and trouble-free means for sealing the meter closed and also for sealing closed the cover of the terminal chamber, than has heretofore been known.

Another object of the invention is to provide satisfactory means for sealing both the main cover and the terminal chamber cover with a single sealing wire.

These objects have been accomplished in the illustrated form of the invention by providing two links pivoted by a common pivot and each engaging a special formation on one of the cover members but so arranged that they may be sealed separately or may be sealed jointly by a sealing wire passing through both. The two links are pivoted on a common pivot, which is protected by an extension of the terminal chamber cover.

This invention was disclosed in the co-pending application of applicant and Frederick Holmes, filed July 16, 1934, Serial No. 735,312, subsequently issued as Patent No. 2,046,307 in the name of Frederick Holmes alone. The present application may, therefore, be considered in the nature of a continuation of said application, although it has been decided that applicant is the sole inventor as to the features covered by the present application.

Additional objects will be apparent from the following description and from the drawing, in which.

Figure 1:
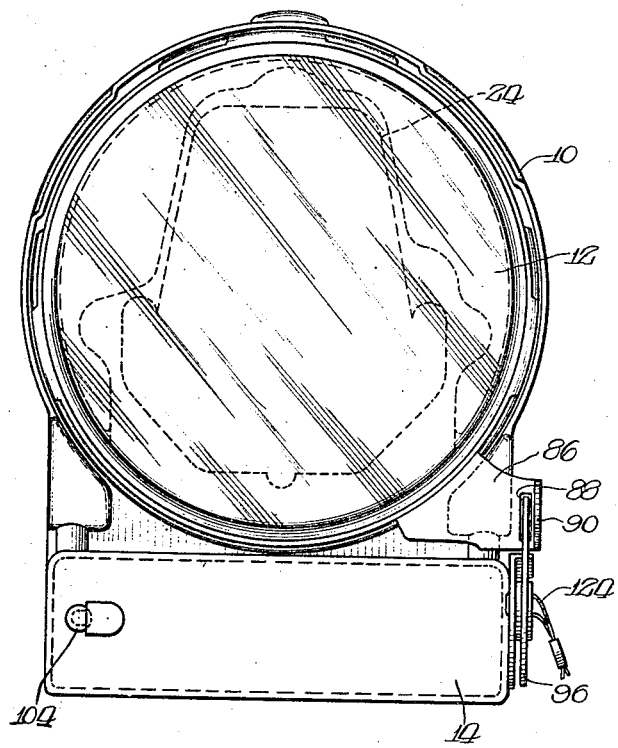
Fig. 1 is a front view of the meter casing with the covers in place.

Although the invention may take numerous forms, only one has been chosen for illustration. In this form the meter casing comprises a base 10, a glass cover 12, and a terminal box cover 14. Although the base structure was an important part of the disclosure of the prior application mentioned, it need not be described in detail here since this invention relates to the sealing features. Likewise the meter element has only been indicated by dotted line 24 in Fig. 1.

Figure 2:
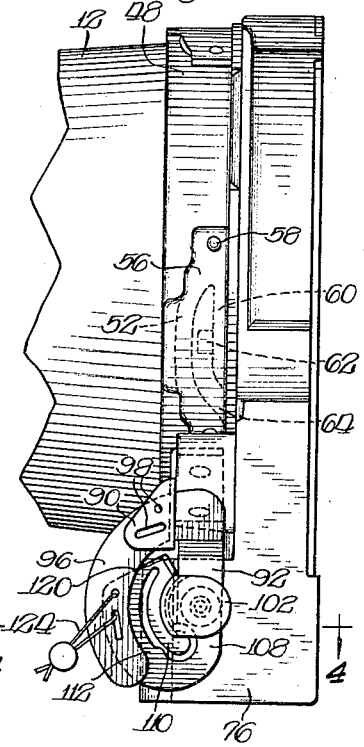
Fig. 2 is a fragmentary side view of the same.
Figure 3:
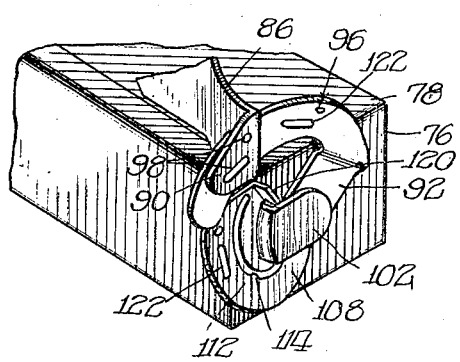
Fig. 3 is a fragmentary perspective view of the sealing links and the cooperating parts of the meter.
Figure 4:
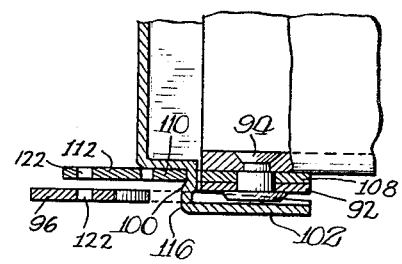
Fig. 4 is a fragmentary sectional view taken substantially along the line 4—4 of Fig. 2 and showing the arrangement of the sealing links.

The cover unit comprises not only the glass cover member 12, but also the flange or collar 48 which is secured to the cover 12 in any suitable way. There are also provided clamps 52, preferably of the bayonet type as shown in dotted lines in Fig. 2. The bayonet clamps 52 preferably lie substantially flush with the inside of the main portion of the collar 48, the collar 48 being pressed out to form a housing 56 in which the clamp 52 is located. This clamp may be secured by a pair of rivets 58 extending through the collar 48 and includes a bayonet portion 60 which may be called the active portion of the clamp. As the cover is inserted in place, a lug 62 formed on the wall of the base passes through the opening 64 in the bayonet clamp, whereupon rotation of the cover in a clockwise direction thrusts the bayonet member 60 behind the lug 62, whereby the cover is held in place. Inasmuch as the bayonet member 60 is resilient, the cover may be turned to the proper position, and will be held firmly seated on the annular seat 42, or on a washer if one is provided.

The lower part of the meter is provided with an enlargement forming a terminal chamber 76. The upper wall 78 of this terminal chamber extends considerably forward of the edge of the glass cover member 12. For locking the cover in place, the cover is provided with a sealing bracket 86 which may be formed as a part of the collar 48 or secured thereto. This bracket is provided with a hole 88 passing therethrough and with a lug 90 extending forwardly therefrom. A pivoted sealing lever 92 is pivoted to the terminal chamber portion of the meter base, as by a suitable pin 94. The lever 92 is provided with an arcuate arm 96 which passes through the hole 88 when the cover is in its secured position. Sealing holes and slots 98 are provided in the lug 90 and the arm 96 to permit the passage of a sealing wire therethrough whenever it should be desired to seal the cover closed without sealing the terminal chamber closed, as is described below.

The terminal box cover 14 is secured at its left end by a headed rivet 104 secured to the base and engaging a slot in the cover 14. At the right hand end the cover 14 is secured by a second pivoted sealing lever 108 which is also pivoted on the pin 94. This second sealing lever engages a lug or extension 100 which in turn is provided with a rearwardly extending shield 102 extending over and around the head of the pin 94 to protect the same from tampering. The lever 108 is provided with a resiliently constructed, arcuately shaped arm 110 which presses resiliently on the extension 100 on the cover 14. Undue yielding of the resilient arm 110 is prevented by the outer arm 112 on which the arm 110 is formed, and which may be provided with a knob 114 for more narrowly limiting the resiliency of the arm 110 at its end, if desired. The extension 100 is provided with a forwardly extending flange or hump 116 which prevents prying the arm 110 laterally from its proper position. The lever 108 may be provided with a laterally extending lug 120 which simultaneously strengthens the connection between the arms 110 and 112 and forms a handle for operation of the lever 108. Sealing holes and slots 122 are provided through the arms 96 and 112 so that a sealing wire 124 may be passed through these arms to seal them both in the position shown in Fig. 2, thus preventing removal of either the cover member 12 or the cover member 14. The link 92 may be sealed separately by using the sealing holes 98 in lug 90 on the cover 12. If it should be desired to seal the lever 108 without sealing the lever 92, this may be accomplished by providing a sealing lug on the cover 14 having holes which will register with the holes 122 in the arm 112.

The structure thus described provides a meter casing having a sealing device which is very easy to use, very dependable, and which at the same time is exceedingly economical in construction and convenient in manufacture and use. It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

I claim:

1. A base for an electric meter having a terminal chamber and a terminal chamber cover, said cover having a laterally extending lug thereon and a sealing link pivoted to said chamber and extending over and across said lug to retain said cover member in place.

2. A base for an electric meter having a terminal chamber, and a terminal chamber cover, said cover having a laterally extending lug thereon, a pivot pin mounted on said chamber, and a sealing link pivoted on said pin and extending over said lug to retain said cover member in place; said lug having a flange depending therefrom and extending around and shielding the pin by which said link is pivoted to said chamber.

3. The combination of a base for an electric meter and a cover therefor, a pivot pin mounted on said base, a locking link pivoted on said pin and arranged to lock said cover closed, and said cover member having thereon a shield which extends over and shields said pivot pin.

4. A casing for an electric meter comprising a base and a cover therefor, said casing having a sealing link pivotally mounted thereon, and said cover having a lug positioned to be engaged by said sealing link; said sealing link having a substantially arcuate resilient arm for engaging said lug, and having a substantially rigid member normally spaced from said arm in position to limit its resilient movement.

5. A casing for an electric meter comprising a base and a cover therefor, said casing having a sealing link pivotally mounted thereon, and said cover having a lug positioned to be engaged by said sealing link; said sealing link having a substantially arcuate resilient free ended bayonet arm for engaging said lug, and having a substantially rigid member normally spaced from said arm in position to limit its resilient movement; said substantially rigid member having a contact point thereon positioned to contact said resilient portion near the free end thereof so as to leave some degree of flexibility at its center portion.

6. A base for an electric meter having a terminal chamber having a pivot thereon, and a terminal chamber cover having a laterally extending lug thereon, a sealing link pivoted on said pivot and extending over said lug to retain said cover member in place, said lug having two flanges, one extending around the pivot by which said link is pivoted to said chamber, and the other extending sufficiently around said sealing link to prevent its removal.

7. A base for an electric device having a pivot thereon, a cover for said base movable to a normal closed position, a sealing link pivoted on said pivot and movable to a position to engage a formation on said cover, when said cover is in said position, to secure said cover in said position, and a shield on and movable with said cover adapted to cover and shield said pivot when said cover is in said position.

ALBERT L. EMENS.